3,578,493
HIGH SOLIDS COATING COMPOSITION
Johanna Wilhelmina v.O Smith, Cape Elizabeth, Maine, assignor to The Scott Paper Company, Delaware County, Pa.
Filed May 29, 1968, Ser. No. 733,173
Int. Cl. D21h *1/28*
U.S. Cl. 117—155                         3 Claims

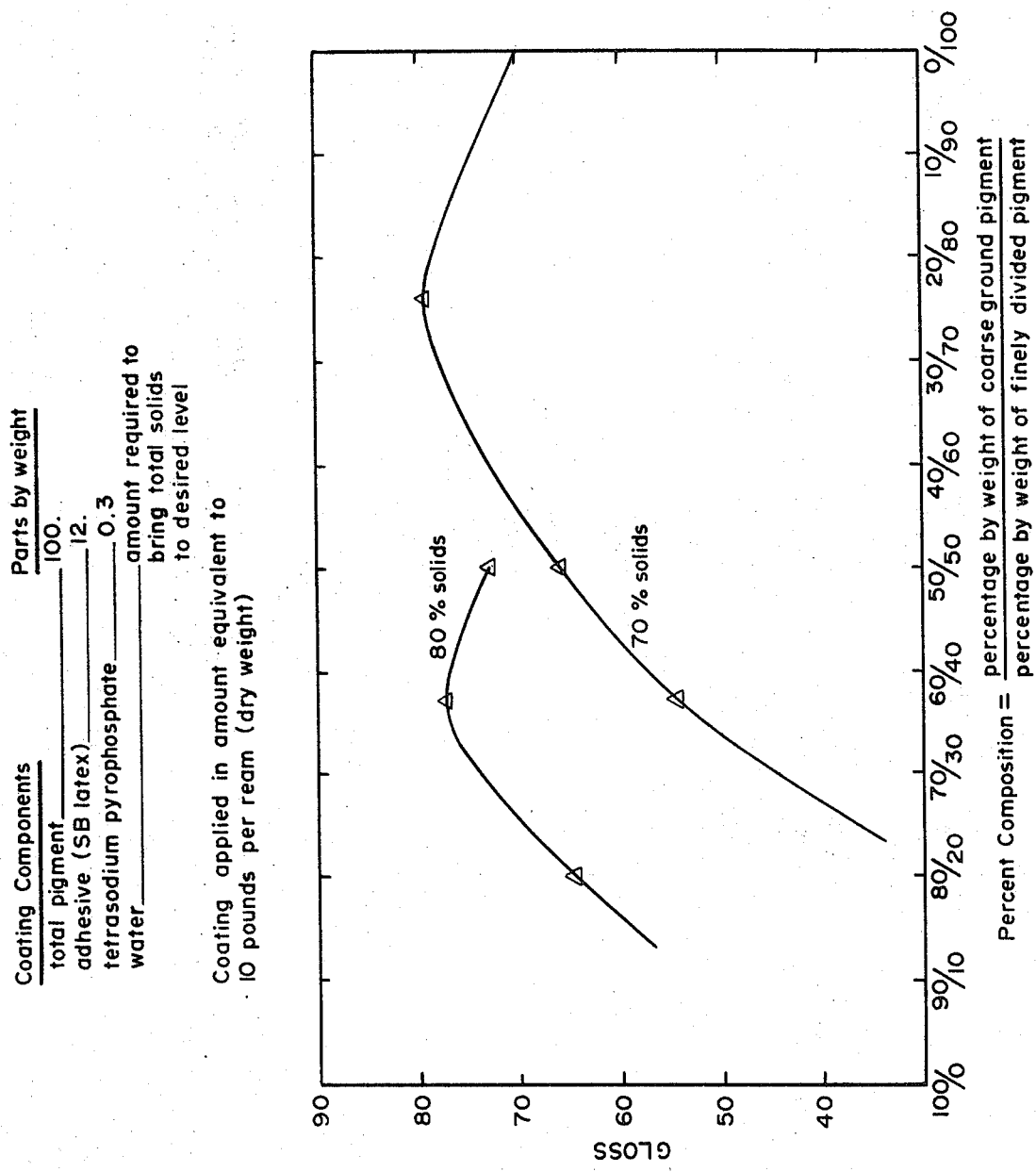

ABSTRACT OF THE DISCLOSURE

Disclosed is an aqueous paper coating composition having a solids content of at least 70 percent by weight with said solids being comprised of a coarse ground substantially spherical pigment, a finely divided pigment and coating binder; said coarse ground pigment comprising from 25 to 90 percent of the total pigment content with the finely divided pigment comprising the remainder of the pigment composition Also disclosed is a process for applying the new paper coating composition and a glossy coated paper product.

BACKGROUND OF THE INVENTION

Figure 1:
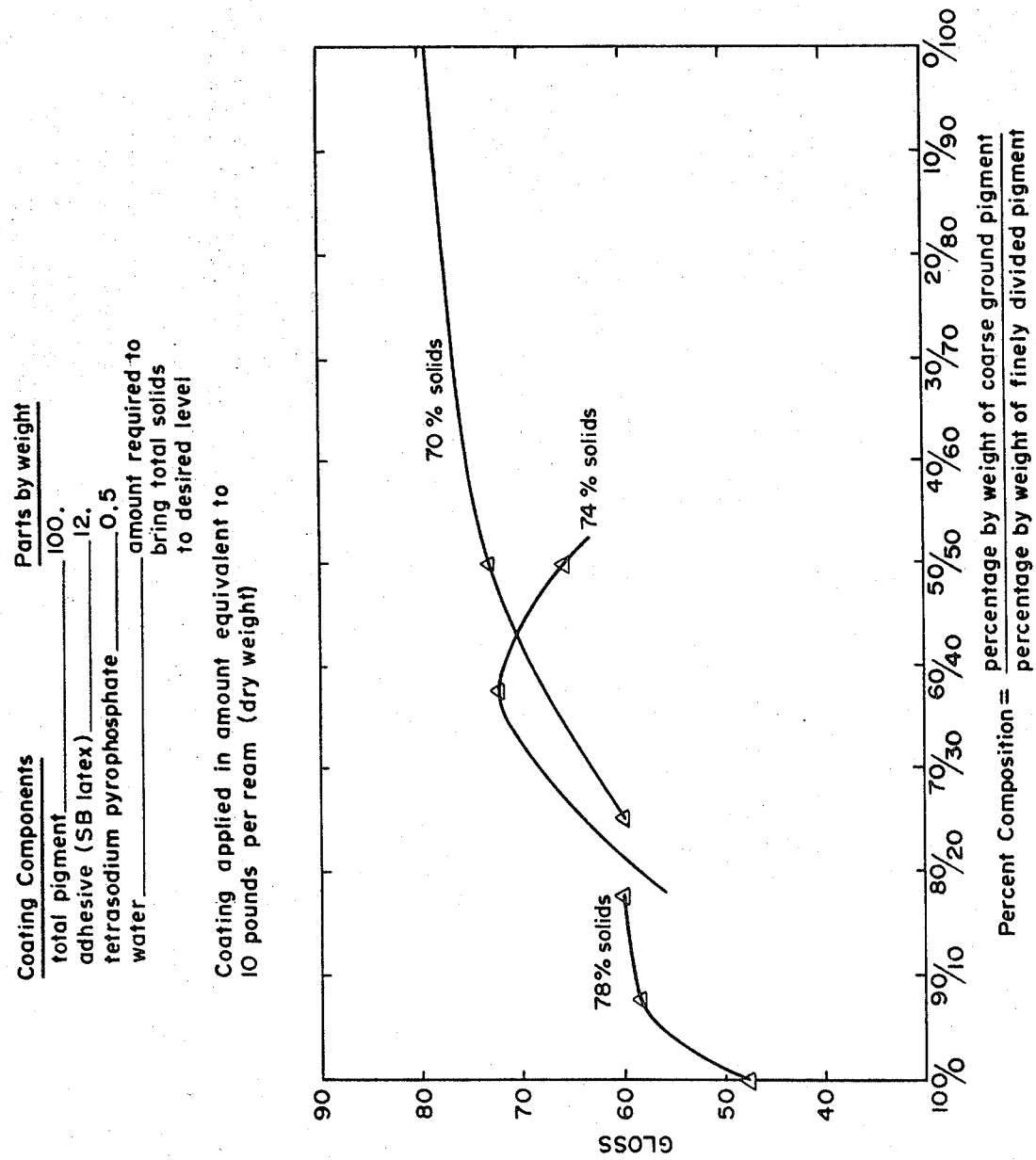
Figure 2:
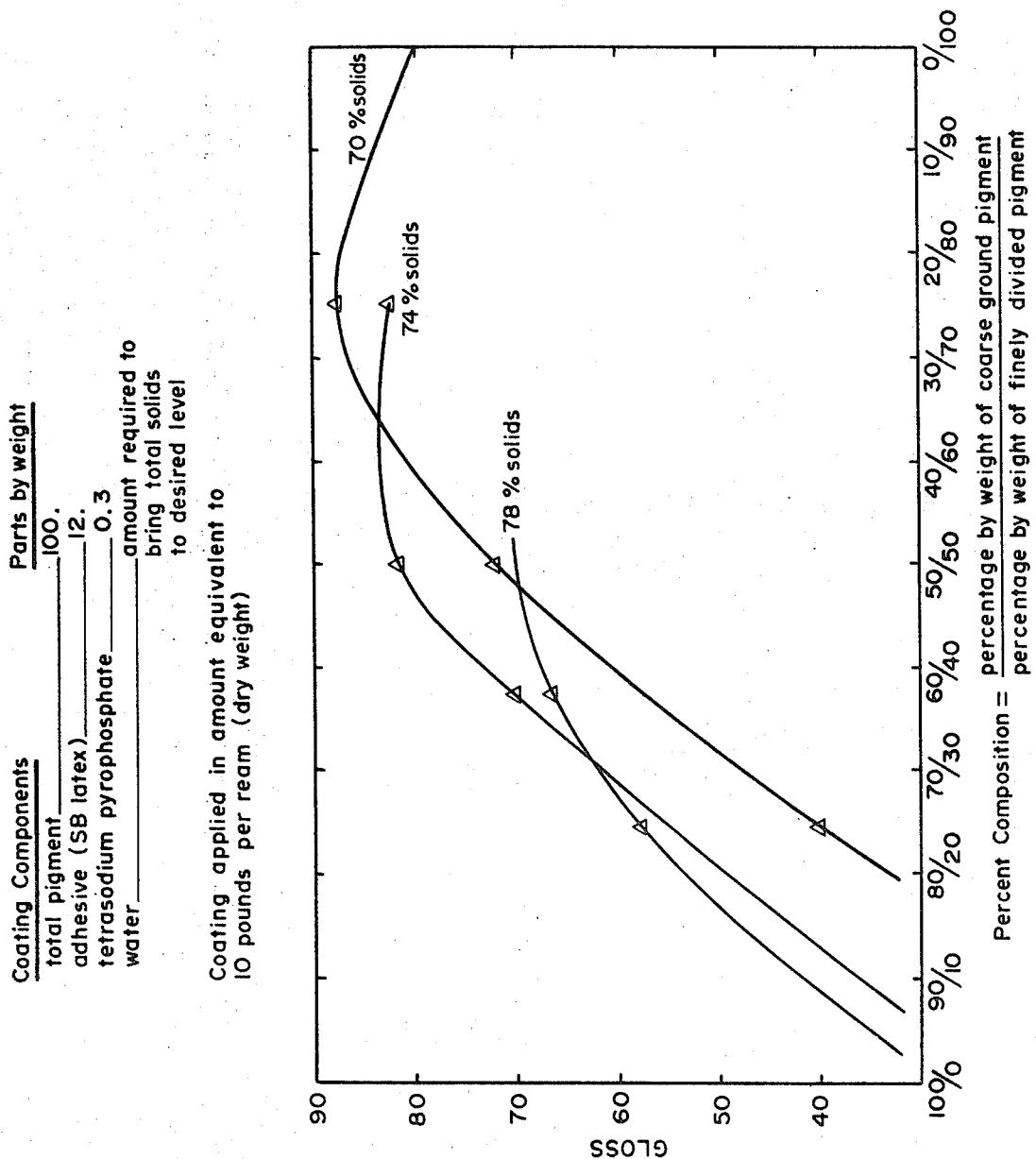

The present invention is directed to a new coating composition, a new process for coating paper web materials and to the new coated paper product produced thereby. This invention relates to improved mineral-coated paper, and particularly to high-grade printing paper having high brightness, high gloss, and good affinity for printing ink. The present invention exhibits an unusual combination of qualities which make the new coating composition, process and product unique and extremely desirable to the paper coating industry. This unusual combination of qualities is attained by the use of a unique high solids coating composition containing large pigments not heretofore associated with the production of glossy printing paper.

Brightness, high finish or gloss, and "affinity for ink" are all characteristics which are highly desirable in high quality printing surfaces. These characteristics are all to be found in the printing surfaces produced in accordance with the present invention.

High brightness of a coated sheet provides the desired contrast between the printing and background areas, making the printing more striking and thus helping to make even mediocre printing crisp and effective. Numerical measurements for brightness are commonly made by means of the General Electric reflection meter. The best grades of supercalendered mineral-coated printing paper commonly have brightness value of the order of from about 78 to about 91.

High finish or glossiness of the coated surface is, of course, not essential for good printing; however, for certain uses it is highly desirable and constantly sought after by the paper making industry. Mineral-coated printing papers are generally divided into two classes: namely, dull-coated papers and glossy-coated paper. The greater part of the mineral-coated printing paper used in the printing of magazines, advertising brochures, labels and annual reports is of the glossy-coated class. High gloss in a sheet of paper gives the finished printed page sparkle and brilliance and for this reason the printing trade demands high gloss in most of its high quality printing paper for the above uses. A numerical value of gloss is commonly obtained by testing the paper by means of a Bausch and Lomb or Hunter glossmeter. A glossmeter reading of about 65 at a 75° angle is considered good.

Furthermore, it is desirable that a fine quality printing sheet exhibit "ink hold-out." The term "ink hold-out" refers to the ability of the printed sheet to limit the absorption of the ink vehicle into the substrate thereby giving the printing good gloss. The coated sheets of the present invention exhibit good ink hold-out while accepting ink uniformly. It is an object of the present invention to provide a high quality printing surface having high gloss, brightness, levelness and ink hold-out.

The coating composition of the present invention has a solids content of from 70 to 82 percent by weight, and preferably from 70 to 80 percent by weight with the solids being comprised of 100 parts by weight of pigment and from 7 to 30 parts by weight of coating binder; said pigment being comprised of from 25 to 90 percent by weight of a coarse ground substantially spherical paper-coating grade pigment, the remainder being a finely divided mineral pigment with said coarse ground pigment being comprised of nearly spherical-shaped particles at least 60 percent of which have a particle size greater than 2 microns equivalent spherical diameter and said finely divided pigment being comprised of particles at least about 60 percent of which have a particle size of less than 1 micron equivalent spherical diameter.

The process of the present invention comprises applying by means of a flexible blade coater to at least one surface of a paper web the coating composition of the present invention and finishing the resulting coated web by means of conventional calendering techniques.

While the product of the present invention possesses all of the characteristics of a fine printing paper, the high gloss of the sheet is completely unexpected and is, in fact, contrary to the teachings of the art.

The gloss of the final surface of a calendered mineral-coated printing paper is dependent upon a variety of factors, all of which are well known to those skilled in the art. Two of the factors which greatly affect the gloss obtained are the specific pigment employed and the pigment particle size. To obtain a glossy mineral coating it heretofore has been generally considered necessary to employ plate-shaped pigments such as mica, Kaolin clays and hydrated alumina, or a pigment having a very small particle size such as high quality coating clay, titanium dioxide, hydrated alumina, precipitated calcium carbonate, precipitated barium sulfate and satinwhite. Materials such as the barytes (ground natural barium sulfate) are large and have been found to be so hard as to be resistant to calender-action and, therefore, result in low finishes within the practical limits of usual supercalender pressures. Ground calcium carbonate is also considered to be a dull pigment because of its large particle size. The present invention employs large sized so-called dull pigments such as ground calcium carbonate or natural barium sulfate to produce printing surfaces having high gloss.

A further advantage of the present invention is that the new coating composition, particularly when employing ground calcium carbonate, is less expensive than most coatings commonly employed to produce glossy coatings. The use of the large particle size ground calcium carbonate can result in a considerable savings in the cost of pigment alone. In addition, the coating compositions employed in the present invention require less adhesive than those coatings containing only finely divided pigments, thereby again decreasing the cost of the raw materials. While such savings in raw materials might not appear to be large, when viewed in the context of the modern paper industry where the production of high gloss quality printing paper at high speeds consumes large quantities of raw materials, small savings in the unit cost of raw materials results in large savings for the manufacturer.

A further advantage of the process of the present invention results from the comparatively small amounts of water employed in the new coating compositions. Most of the water in a coating composition must be removed from the coated paper web following application of the coating. The removal of this water from the paper stock and from the coating requires energy and time. Furthermore, the drying equipment often occupies large areas of mill space which might be more profitably used for other operations. By decreasing the amount of water in the coating composition, the amount of water to be removed in drying is decreased, thereby decreasing the amount of energy required, the time interval required and the amount of space required to accomplish the desired drying. This decrease in drying costs and saving of space are usually extremely important to a high speed, large volume paper mill. Furthermore, the coatings of the present invention can be applied by machines having low drying capacity, thereby enabling many mills to produce large volumes of high gloss paper without costly replacement of existing equipment.

A still further advantage of a high solids coating is that it increases the amount of coating composition which can be stored in a given area; or viewed from another angle, it decreases the amount of space required to store a given amount of coating. Furthermore, the pumping problems generally associated with high solids coatings are not encountered in the coatings of the present invention due to the lower viscosity imparted by the generally spheroidal or rhomboidal shape of the large ground calcium carbonate and barium sulfate particles.

PRIOR ART

The prior art mentions the use of aqueous coatings containing up to 70 percent solids for use in paper coatings processes; however, 70 percent solids has been considered to be the maximum solids content which could be used. The use of coatings containing greater than 70 percent solids by weight has been considered impractical because they could not be pumped or uniformly spread because of the dilatant characteristics of such high solids compositions. While the art contains references to slurries containing over 70 percent solids, these slurries were generally diluted to about 50 to 65 percent solids before being applied to paper.

Furthermore, in the past high solids coatings, i.e., developed for high gloss coatings containing from 55 to 65 percent solids by weight, have been largely comprised of pigments having a small particle size. Therefore, not only does the prior art fail to teach the use of aqueous paper coating compositions containing greater than 70 percent solids, but the art fails to teach or suggest the use of glossy high solids coatings containing substantial proportions of large substantially spherically shaped particles of the so-called dull pigments.

In the past, in order to produce glossy paper, it has been considered necessary to utilize a pigment having a small particle size as distinguished from ground calcium carbonate (see Casey, James P., Pulp and Paper, 2 ed., vol. III, p. 1618–1621, 1961). Precipitated calcium carbonate "has been employed to produce high-gloss paper but only when at least 80 percent of the particles have a particle size less than 2 microns equivalent spherical diameter with preferably all particles less than 1 micron in size" (U.S. Patent No. 2,395,992) and then only by employing greater than normal calendering pressures. Furthermore, the high finishing types of calcium carbonate (precipitated calcium carbonate) must be dispersed at low solids concentrations because of their high water demand. Ground calcium carbonate has long been recognized as a pigment capable of preventing or decreasing glossiness in calendered coated paper and, prior to the present invention, was not used for the production of high gloss printing paper. Furthermore, ground natural barium sulfate or barytes have not been used to produce glossy supercalendered paper; in fact, the ground barytes have been considered to be useful only for the production of dull-coated papers.

The use of large particle size ground calcium carbonate or ground barium sulfate to produce high gloss coatings is unknown and unsuggested by the art. In fact, recently issued U.S. Patent No. 3,362,845 teaches that the use of greater than 20 percent of large sized calcium carbonate in the top coating of a two layer coating causes a decrease in the desired printing characteristics of the coated surface.

SUMMARY OF THE INVENTION

The present invention is directed to a novel paper coating composition, to the method of applying said coating compositions and to the glossy coated paper produced by the use of the coating and method of the present invention.

The new coating composition of the present invention has a solids content of from 70 to 82 percent by weight, the solids being comprised of about 100 parts by weight of paper coating grade mineral pigments and from 7 to 30 parts by weight of coating binder to 100 parts of mineral pigment, said mineral pigment being comprised of from 25 to 90 percent by weight of coarse substantially spherical paper coating grade pigment, wherein at least 60 percent by weight of said coarse spherically shaped pigment has an equivalent spherical diameter of greater than 2 microns, the remainder being a finely divided paper coating grade mineral pigment having at least 60 percent of the particles with an average particle size of less than 1 micron equivalent spherical diameter.

It is critical to the present invention that the coarse pigment be substantially spherical in shape. In the present specification and claims, the term "substantially spherical" includes those materials having an aspect ratio (ratio of greater dimension to the lesser dimension) approaching 1 but not greater than 3:2. The substantially spherical particles of the present invention include rhomboidal materials. The nearly spherical particles can have smooth rounded surfaces and facets or the particles can be rough and irregular with jagged corners. Representative coarse pigments include ground natural calcium carbonate and ground natural barium sulfate. Plate-, needle-, leaf-, and the like-shaped mineral pigments cannot be employed as the coarse pigment in the present invention. The coarse ground pigments of the present invention must have a particle size distribution such that at least 60 percent of the particles have an equivalent spherical diameter of greater than 2 microns with the average particle size of the coarse ground pigment being between 2 and 10 microns equivalent spherical diameter.

The term "finely divided pigments" as employed in the present specification and claims refers to finely divided pigments where 60 percent or more of the pigment particles have an equivalent spherical diameter of less than 1 micron. It is highly desirable that the finely divided pigments have a low water demand. This becomes particularly important as the proportion of finely divided pigment becomes greater with respect to the amount of coarse pigment. The use of large proportions of finely divided pigments having a high water demand decreases the available moisture in the coating thereby causing dilatancy in the coating which prevents it from being applied smoothly. However, a small amount of high water demand finely divided pigment can be employed in admixture with one or more other finely divided pigments provided the total water demand of the coatings is such that the coating has a viscosity of preferably between 100 to 30,000 centipoises and no higher than 50,000 centipoises as measured by a Brookfield viscometer at 100 r.p.m.

The term "coating binder" as employed in the present specification and claims refers to pigment adhesives which are heat or pressure moldable in the final coating. The coating binder is employed at a concentration of from 7 to 30 parts by weight with the amount of adhesive binder to be employed dependent upon a variety of factors such as the ratio of finely divided to coarse pigment, chemical composition of pigments, bonding strength of the particular binder or binders being employed, total solids of the coating composition, and the coating strength required by the printing process for which the paper is intended. The selection of an appropriate binder to satisfy a particular requirement is well known in the art. However, the final coating composition should have a viscosity of between 100 and 50,000 centipoises and preferably between 100 and 30,000 centipoises in order to facilitate smooth application. Therefore, in selecting a coating binder and the amount to be employed, care should be taken to keep the viscosity of the coating composition within the broad range given. In order to keep the viscosity of the final coating composition within the described viscosity range, it generally will be necessary to employ a low water demand binder. However, if it is deemed necessary, a small portion, generally up to about 5 percent of the binder, can be comprised of a water-swellable binder provided the viscosity of the final coating composition is between 100 and 50,000 centipoises. Binders such as casein, starch, polyvinyl alcohol and soya protein cannot be employed as the sole binder in the present invention; however, they can be mixed with other binders provided the viscosity of the final coating composition is kept within the desired range. High water demand binders must be employed at very low concentrations. Representative coating binders to be employed in the present invention include the following latices commonly employed in paper coating compositions: copolymers of butadiene such as styrene-butadiene and butadiene-acrylonitrile, styrene copolymers, isoprene copolymers, acrylonitrile copolymers, polyvinyl chloride, polyvinyl acetate, polyvinyl acetate copolymers, cellulose derivatives such as ethyl cellulose and cellulose acetate, acrylic polymers such as ethyl-methacrylate, butyl-methacrylate and other polyacrylates, vinylidene chloride, vinylidene chloride copolymers, maleic anhydride ester copolymers and polyurethane.

In addition to the coarse pigment, finely divided pigment and coating binder, the paper coating compositions of the present invention can contain any of the other additives commonly employed in paper coating compositions. Representative additives include dyes, anti-foaming agents, dispersants, lubricants and the like. Insolubilizers which cross-link with the adhesive to prevent pick-out on a printing press and to decrease the water sensitivity of the final coating such as melamine-formaldehyde resins and glyoxal can also be employed. Representative dispersants to be employed in the coating composition of the present invention include the inorganic polyphosphates such as tetrasodium pyrophosphate, sodium acid polyphosphate, sodium hexa-meta-phosphate, and ammonium amidopolyphosphate; carboxylated latices such as the acrylic latices, highly carboxylated styrene-butadiene latices and polyvinyl alcohol, casein and sodium polyacrylates. These dispersants are generally employed in relatively small amounts; the amount required for paper coating compositions is well known to those skilled in the art. The highly carboxylated latices (when employed at an alkaline pH), polyvinyl alcohol and casein are high water demand binders in addition to being pigment dispersants. Therefore, care must be exercised not to employ these high water demand binder-dispersants in amounts which produce coating viscosities outside of the range of from 100 to 50,000 centipoises. Generally, the high water demand dispersants are employed in amounts equivalent to less than 10 percent of the total binder composition.

The various solid components of the paper coating composition are added to water and thoroughly blended to produce a coating composition which can be uniformly applied to a base web by conventional flexible blade coating techniques. The order of addition of the various components is not generally critical.

The paper coating composition of the present invention is applied to at least one side of a paper web by means of a flexible blade coater. The coated paper is then dried and finished in a conventional manner. The aqueous coating composition is applied in an amount sufficient to provide from about 4 to 15 pounds per ream (500—25 x 38" sheets—3300 square feet) dry weight per side and preferably at a rate of from about 6 to about 12 pounds per ream. The aqueous coating composition of the present invention can be applied to a paper web traveling at speeds up to about 4000 feet per minute. The application of the aqueous coating composition can be carried out "in line" on a conventional paper machine. In an alternative procedure, the paper can be coated on off-machine coaters.

Following the application of the aqueous coating composition to the paper web, the coating is dried by any suitable means such as air drying, radiant heat, drying cans, high velocity dryers or the like. The coated web is dried until the paper web has a water content of from about 3 to 8 percent by weight. The dried paper is then finished by conventional finishing techniques such as supercalendering, gloss calendering, brushing or any combination thereof. The glossy finishes obtained in the present invention are obtained without casting. In essence, the finishing treatment of the dried paper or substantially dry paper consists of passing the coated paper through one or more nips between pressure rolls with one of the rolls in each nip being hard and the other roll being resilient. The hard roll which contacts the coated surface can be heated if desired. A nip pressure of from 1000 to 4000 pounds per linear inch is commonly employed in a supercalender and from 150 to 750 pounds in the gloss calender.

The paper substrate to be coated can vary in weight from 30 pounds per ream printing paper to 24 point board. The substrate can be base coated on one or both sides prior to the application of the aqueous coating composition of the present invention.

The process of the present invention produces a novel coated paper product which comprises a paper substrate carrying on at least one side thereof a calendered, non-cast surface coating having a gloss of at least 60 as measured at a 75° angle by a Hunter glossmeter, said coating consisting essentially of (1) a pigment component comprised of: (a) from 25 to 90 percent by weight of a coarse substantially spherical pigment of which at least 60 percent by weight of the particles have an equivalent spherical diameter of greater than 2 microns and an aspect ratio not greater than 3:2, and (b) the remainder a finely divided pigment component having at least 60 percent of the particles with an equivalent spherical diameter of less than 1 micron and (2) a low water demand binder component; with from 7 to 30 parts of the binder being employed for each 100 parts of the pigment; said coating being present on the surface of the web in an amount equivalent to 4 to 15 pounds per ream dry weight and said coating being applied as an aqueous coating composition having a total solids content of from 70 to 82 percent by weight by means of a flexible-blade coating apparatus.

The proportions of coarse pigment to finely divided pigment can vary within the range of 25 to 90 percent by weight coarse pigment with the remainder being finely divided pigment. The desired ratio of coarse pigment to finely divided pigment will be dependent upon a number of factors: the coarse pigment selected, the finely divided pigment selected, the binder employed and the total solids content desired. The proportions of pigments to be employed will be discussed in the next section.

DESCRIPTION OF THE GRAPHS

Graphs 1–3 illustrate the gloss of various coatings produced in accordance with the present invention.

Graph 1 shows the gloss values of coatings wherein the coarse ground pigment was ground calcium carbonate having an average particle size of greater than 2 microns equivalent spherical diameter and having a particle distribution such that at least 60 percent of the particles have an equivalent spherical diameter of greater than 2 microns and the size distribtuion of the finely divided pigments is such that 75 percent of the particles have an equivalent spherical diameter of less than 1 micron.

Graph 2 shows the gloss values of coatings wherein the coarse ground pigment is calcium carbonate having an average particle size of 7.4 microns with 80 percent of the particles having an equivalent spherical diameter of greater than 2 microns and the finely divided pigment has a size distribution of 75 percent of the particles having an equivalent diameter of less than 1 micron.

Graph 3 illustrates the gloss values of coatings wherein the coarse ground pigment is barium sulfate having an average spherical diameter of 6 microns with 80 percent of the particles having an equivalent spherical diameter of greater than 2 microns and the finely divided pigment has a size distribution such that 60 percent of the particles have an equivalent spherical diameter of less than 1 micron.

SPECIFIC EMBODIMENTS

The coatings employed for the production of the graphs 1–3 were comprised of 100 parts by weight total pigment (coarse plus finely divided), 12 parts dry weight of carboxylated styrene-butadiene latex (sold by the Dow Chemical Company as Dow Latex 620), 0.3 or 0.5 part of tetrasodium pyrophosphate and enough water to produce the desired solids level. The aqueous coating compositions were applied to one side of a web of bleached body stock having a basis weight of 50# ream which had been based coated with a clay-starch coating in an amount equal to 3# ream. The coating composition of the present invention was applied in amounts sufficient to provide 10 pounds dry weight per ream (330 square feet). The coated paper was then dried and supercalendered. All gloss readings were made at 75° angle with a Hunter glossmeter.

The proportions of coarse ground pigment to finely divided pigment will vary within the ranges given according to the type of coarse pigment employed, the size of the coarse pigment, the finely divided pigment and, of course, the gloss desired. It is essential to select the pigments and proportions of pigments which will produce a satisfactory coating composition without causing dilatancy therein and thereby preventing the uniform application of the coating composition. Normally a combination of pigments which will produce a coating composition having high gloss will be selected; however, by proper selection of the component pigment, high solids coatings can be successfully employed to produce dull or matte finishes.

When employing ground calcium carbonate as the coarse substantially spherical pigment of the present invention, the proportions of coarse pigment to finely divided pigment will vary, depending upon particle size of the coarse pigment being employed and upon the gloss characteristics desired. As illustrated by graph 1, when a ground calcium carbonate having an average particle diameter of 2 microns equivalent spherical diameter with at least 60 percent of the particles having an average particle size greater than 2 microns is employed as the coarse pigment, glosses of 60 or greater can be obtained by using compositions having between 70 and 78 percent solids. In such compositions, very high glosses are obtained when the solids content of the coating composition ranges between about 70 to 75 percent solids with the pigment being comprised of from 25 to 75 percent by weight of the coarse ground calcium carbonate and the remainder finely divided clay. When employing compositions having between 75 to 78 percent solids, it is necessary in order to obtain gloss of 60 that the pigment be comprised of from about 80 to about 90 parts by weight ground calcium carbonate and from about 10 to 20 parts by weight finely divided clay. The use of greater amounts of finely divided clay results in an extremely dilatant material which cannot be uniformly applied to the paper substrate.

When employing ground calcium carbonate having a still larger particle size, for example a material having an average particle size of 7 microns with 80 percent greater than 2 microns equivalent spherical diameter, different proportions of coarse ground calcium carbonate and finely divided pigment are employed to obtain the desired high gloss. As can be seen from graph 2, when employing a coating composition containing about 78 percent solids, it is desirable that the pigment be comprised of from 50 to 75 percent by weight coarse ground calcium carbonate and the remainder finely divided clay. At 70 to 74 percent solids, about 25 to 65 parts by weight of coarse calcium carbonate with the remainder finely divided clay can be employed to produce the desired gloss.

Graph 3 also shows the unexpected gloss curves obtained when operating at solids contents of 70 percent or greater, wherein at least 25 percent by weight of the total pigment is coarse ground barium sulfate. When employing a coating composition having 80 percent solids, it is desirable that the pigment portion of the coating be comprised of about 50 to 85 percent by weight coarse ground barium sulfate and the remainder finely divided clay. When the proportion of finely divided pigment is increased beyond about 50 percent of the total pigment at this high solids level, the coating becomes so dilatant that the coating cannot be applied uniformly. However, as the total solids content of the coating is decreased to 70 percent, the proportion of fine particle pigment which may be employed increases until an optimum gloss is obtained at a sulfate-clay ratio of 25 to 75.

It is a completely unexpected result of the present invention that as the percent total solids is increased the optimum gloss at a given solids level is obtained at higher proportions of coarse ground pigment to finely divided pigment. This effect becomes more pronounced as the average particle size of the coarse ground pigment increases. This is, as stated previously, particularly unexpected when the coarse ground pigments employed, i.e., ground calcium carbonate and ground barium sulfate, are taught by the skilled in the art to be dull finish grade pigments. It is a further unexpected property that in those cases where a 100 percent fine pigment coating composition can be prepared and applied successfully at solids of 70 percent and above, substantially the same gloss is obtained when 25 percent of the fine pigment is replaced by the coarse pigment.

Example 1

An Abbe mixer was charged with 30 parts by weight of water. The following materials were added with agitation to the aqueous charge: 50 parts of a pre-dispersed high-quality domestic paper coating grade clay having an average particle size of 0.6 micron equivalent spherical diameter and 75 percent of the particles having equivalent spherical diameter of less than 1 micron (Lustra Clay, sold by Freeport Kaolin Company); 50 parts by weight of ground limestone ($CaCO_3$) having an average particle size of 2.65 microns equivalent spherical diameter (60 percent greater than 2 microns equivalent spherical diameter, sold by Harry T. Campbell's Sons as Camel-Wite®); 0.15 parts sodium polyacrylate (a dispersing agent sold by Dewey Almy Company as Daxad 30). Agitation was continued until this mixture was thoroughly blended whereupon 20.6 parts (wet weight; dry solids 10.0 parts) of a slightly carboxylated styrene-butadiene latex (sold by The Dow Chemical Company as Dow Latex QX–5004) were added. To the coating composition thus prepared was added 6.5 parts of water to bring the total solids content to 70 percent by weight. This aqueous coating composition was then applied to one side of a web of bleached paper body stock having a basis weight of 50 pounds per ream (500— 25 x 38" sheets) and having a clay-starch base coat of 3 pounds per ream per side. The coating composition of the present invention was applied by means of a trailing blade coater at 1.5 p.l.i. blade pressure in an amount sufficient to provide 10 pounds (dry weight) of coating per ream. Two different runs using this coating composition were carried out. On the first run, the coating was applied to a paper web traveling at 600 feet per minute and in the second run the coating was applied to base stock traveling at 1200 feet per minute. The coated paper web thus prepared was thereafter dried by means of conventional paper machine drying cans and supercalendered through a four-nip stack. The nip pressure in the stack was 1500 p.l.i. per nip. After the paper was supercalendered the gloss was measured by means of a Hunter gloss meter at 75°.

The aqueous coating composition and the dried, finished, coating surface exhibited the following characteristics:

AQUEOUS COATING COMPOSITION

Brookfield-viscosity:
    At 20 r.p.m. ---------------------------- 2400
    At 100 r.p.m. --------------------------- 830

| Dried finished coating surface | 600 f.p.m. | 1,200 f.p.m. |
|---|---|---|
| Brightness (G.E.) | 81.3 | 81.1 |
| Opacity (B&L) | 93.0 | 92.0 |
| Gloss (Hunter 75°) | 72.7 | 71.3 |
| Ink gloss (Ink plus weight), IPI Letterpress Gloss Testing Orange Ink, .0003 in., Hunter 75° | 67.0 | 64.0 |

Example 2

The following materials are mixed in an Abbe mixer in the order and amounts as listed:

Water—20 parts
Lustra Clay, predispersed domestic clay—average particle size 0.6 micron equivalent spherical diameter—50 parts
Ground calcium carbonate (limestone)—(Camelcarb, sold by Harry T. Campbell's Sons) average particle size 7.4 microns equivalent spherical diameter—50 parts
Tetrasodium pyrophosphate—0.07 part
Styrene-butadiene (dry solids, 12 parts—Dow 620 Latex)—24 parts
Water—7 parts
Total solids content—74 percent This coating is then applied to one side of a precoated base sheet by means of a trailing blade coater at a rate of 10 pounds dry weight per ream. The base sheet is comprised of a blenched body stock having a basis weight of 50 pounds per ream and was precoated with 3 pounds dry weight of clay-starch coating per ream per side. After application of the coating of the present invention, the web is dried and supercalendered through four nips at 1500 pounds per linear inch. After super-calendering, a gloss reading of about 80 is obtained (Hunter glossmeter at 75°).

Example 3

A coating composition of the present invention is prepared by mixing together 62.5 parts by weight coarse ground calcium carbonate having an average particle size of 2 microns with 60 percent of the particles having an equivalent spherical diameter of 2 microns or greater, 37.5 parts by weight of finely divided predispersed clay with 60 percent of the particles having an equivalent spherical diameter of less than 1 micron, 12 parts styrene-butadiene latex (The Dow Chemical Company's No. 620), 0.2 part tetrasodium pyrophosphate and water to bring the total solids content to 74 percent solids. This coating when applied to a paper substrate as described in Example 2, dried and super-calendered, exhibits a Hunter 75° angle gloss of 73.

Example 4

A series of coatings was prepared from 50 parts by weight of ground calcium having an average spherical diameter of 2 microns with 60 percent of the particles having an equivalent spherical diameter of greater than 2 microns, 50 parts of finely divided predispersed No. 1 coating clay wherein 75 percent of the particles have an equivalent spherical diameter of less than 1 micron, 12 parts of coating binder, 0.15 part of tetrasodium pyrophosphate (if any) and sufficient water to produce coatings having a total solids contents of 70 percent by weight. The composition of the coating binder was varied in each number of the series with the various coatings containing from 0 to 7 parts of pearl starch with styrene-butadiene latex (Dow 620) being employed to make up the remainder of the binder content. The various coatings were applied to paper substrates, finished as described in Example 2, and the gloss of the finished coatings measured. The following table sets forth the binder composition and the gloss of the finished coating.

TABLE

| Coating No. | Binder composition (12 parts total) | Gloss [1] |
|---|---|---|
| 1 | 12 parts styrene-butadiene latex | 74 |
| 2 | 3 parts enzyme converted corn starch plus 9 parts styrenebutadiene latex | 70 |
| 3 | 5 parts enzyme converted corn starch plus 7 parts styrenebutadiene latex | 62 |
| 4 | 7 parts enzyme converted corn starch plus 5 parts styrenebutadiene latex | 59 |

[1] Hunter glossmeter at 75° C.

Example 5

In a further operation a coating composition prepared substantially as in Example 4 was prepared. However, the binder composition was changed. In this further operation the binder was comprised of 2.5 parts of alkaline cut casein in admixture with 9 parts of styrene-butadiene. The coating thus produced was dilatant and when coated on paper gave a gloss of 63. When the casein content of the binder was raised to 5 parts (about 42 percent of the binder), the coating could not be spread on the paper substrate.

I claim:

1. A coated paper product which comprises a paper substrate carrying on at least one side thereof a calendered, non-cast surface coating having a gloss of at least 60 as measured at a 75° angle by a Hunter glossmeter, said coating consisting essentially of (1) a pigment component comprised of (a) from 25 to 90 percent by weight of a coarse substantially spherical pigment of which at least 60 percent by weight of the particles have an equivalent spherical diameter of greater than 2 microns and an aspect ratio not greater than 3:2, and (b) the remainder a finely divided pigment component having at least 60 percent of the particles with an equivalent spherical diameter of less than 1 micron and (2) a low water demand binder component; with from 7 to 30 parts of the binder being employed for each 100 parts of the pigment; said coating being present on the surface of the web in an amount equivalent to 4 to 15 pounds per ream dry weight.

2. The coated paper product according to claim 1 wherein the coarse substantially spherical pigment comprises ground calcium carbonate.

3. The coated paper product according to claim 1 wherein the coarse substantially spherical pigment comprises ground barium sulfate.

References Cited

UNITED STATES PATENTS

| | | | |
|---|---|---|---|
| 2,175,096 | 10/1939 | Strauch | 260—9 |
| 2,395,992 | 3/1946 | Clark | 117—156X |
| 2,949,382 | 8/1960 | Dickerman et al | 117—83X |
| 3,028,258 | 4/1962 | Rice | 117—156X |
| 3,152,918 | 10/1964 | Graus | 117—156X |
| 3,281,267 | 10/1966 | Rice | 260—29.6UX |
| 3,288,632 | 11/1966 | Rush et al. | 117—83X |
| 3,362,845 | 1/1968 | Brundige | 117—155X |
| 3,415,671 | 12/1968 | Rice | 117—156X |
| 3,468,698 | 9/1969 | Pelletier et al. | 117—83X |

WILLIAM D. MARTIN, Primary Examiner

M. R. LUSIGNAN, Assistant Examiner

U.S. Cl. X.R.

117—156, 157